US012664663B2

(12) United States Patent
Mizukami

(10) Patent No.: US 12,664,663 B2
(45) Date of Patent: Jun. 23, 2026

(54) IMAGE PROCESSING APPARATUS, IMAGE PROCESSING METHOD, PROGRAM, AND RECORDING MEDIUM

(71) Applicant: FUJIFILM Corporation, Tokyo (JP)

(72) Inventor: Hiroyuki Mizukami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 96 days.

(21) Appl. No.: 18/588,701

(22) Filed: Feb. 27, 2024

(65) Prior Publication Data

US 2024/0289963 A1 Aug. 29, 2024

(30) Foreign Application Priority Data

Feb. 28, 2023 (JP) ................................ 2023-029108

(51) Int. Cl.

| | |
|---|---|
| ***G06T 7/13*** | (2017.01) |
| ***G06T 7/136*** | (2017.01) |
| ***G06T 7/90*** | (2017.01) |
| ***H04N 23/63*** | (2023.01) |

(52) U.S. Cl.

CPC ................ *G06T 7/13* (2017.01); *G06T 7/136* (2017.01); *G06T 7/90* (2017.01); *H04N 23/635* (2023.01); *G06T 2207/10024* (2013.01); *G06T 2207/20081* (2013.01)

(58) Field of Classification Search

CPC .. G06T 7/13; G06T 7/136; G06T 7/90; G06T 2207/10024; G06T 2207/20081; H04N 23/635; H04N 1/00161; H04N 1/00167; H04N 1/00172; H04N 1/00188; H04N 1/40093; G06V 10/44

See application file for complete search history.

(56) References Cited

U.S. PATENT DOCUMENTS

| | | | |
|---|---|---|---|
| 2007/0052818 | A1 | 3/2007 | Makino et al. |
| 2014/0362248 | A1 | 12/2014 | Ishida |
| 2019/0171876 | A1 | 6/2019 | Segalovitz et al. |

(Continued)

FOREIGN PATENT DOCUMENTS

| | | |
|---|---|---|
| JP | 2007-074579 A | 3/2007 |

OTHER PUBLICATIONS

The extended European search report issued by the European Patent Office on Jul. 8, 2024, which corresponds to European Application No. 24159822.6-1207 and is related to U.S. Appl. No. 18/588,701.

(Continued)

*Primary Examiner* — Yogesh K Aggarwal
(74) *Attorney, Agent, or Firm* — Studebaker Brackett PLLC

(57) ABSTRACT

Provided are an image processing apparatus, an image processing method, a program, and a recording medium for more appropriately extracting an image corresponding to a printed matter from a captured image of the printed matter by solving the above-described problem of the related art. An image processing apparatus that extracts an image corresponding to a printed matter from a captured image includes a processor, in which the processor executes an estimation process of estimating a first range including the printed matter in the captured image by applying a range estimation model constructed by machine learning regarding the printed matter to the captured image.

16 Claims, 11 Drawing Sheets

(56) References Cited

U.S. PATENT DOCUMENTS

| | | | | |
|---|---|---|---|---|
| 2020/0099820 | A1 | 3/2020 | Miyamori | |
| 2020/0242388 | A1 | 7/2020 | Mondal et al. | |
| 2023/0177828 | A1* | 6/2023 | Dai | G07G 1/0063 348/143 |

OTHER PUBLICATIONS

Zhang et al; "Marior: Margin Removal and Iterative Content Rectification for Decument Dewarping in the Wild"; pp. 2805-2815; XP058896197; Oct. 10, 2022; New York, NY, USA.

* cited by examiner

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C. § 119 to Japanese Patent Application No. 2023-029108, filed on Feb. 28, 2023. The above application is hereby expressly incorporated by reference, in its entirety, into the present application.

BACKGROUND OF THE INVENTION

1. Field of the Invention

One embodiment of the present invention relates to an image processing apparatus that extracts an image corresponding to a printed matter from a captured image.

2. Description of the Related Art

An image of a predetermined object may be extracted from a captured image, the extracted image may be converted into data and stored, and then the converted image may be used. As a method of extracting the image to be extracted from the captured image, an edge detection method is generally used.

Examples of a scene in which the above-described image extraction method is used include a case in which a printed matter on which an image to be printed is printed, for example, a photographic print is imaged, and an image of the photographic print is extracted from the captured image (see, for example, JP2007-074579A).

In the technique of JP2007-074579A, an edge detection method is applied to extract a region where a photographic print image, which is an image of a photographic print assumed to have fading, exists from the captured image of the photographic print. Then, a binary image of the captured image is generated, and the region where the photographic print image exists is extracted from the captured image based on edges remaining after removing edges contacting an outermost edge of the binary image.

SUMMARY OF THE INVENTION

In a case in which an image corresponding to the printed matter is extracted from the captured image, it is preferable to more accurately extract the image to be extracted and to more efficiently extract the image. For that purpose, in a case in which the image corresponding to the printed matter is extracted, it is necessary to take measures such as suppressing erroneous detection of an edge of the image. In addition, there is a demand for an edge detection method with improved detection accuracy as compared with the conventional method.

An object of one embodiment of the present invention is to provide an image processing apparatus, an image processing method, a program, and a recording medium for more appropriately extracting an image corresponding to a printed matter from a captured image by solving the above-described problem of the related art.

In order to achieve the above object, according to one embodiment of the present invention, there is provided an image processing apparatus that extracts an image corresponding to a printed matter from a captured image, the image processing apparatus comprising: a processor, in which the processor executes an estimation process of estimating a first range including the printed matter in the captured image by applying a range estimation model constructed by machine learning regarding the printed matter to the captured image.

In addition, in the estimation process, the processor may estimate the first range by applying the range estimation model constructed by the machine learning regarding an appearance of the printed matter to the captured image.

In addition, the appearance may be at least one of a size of the printed matter, a shape of the printed matter, or a feature of a print surface of the printed matter.

In addition, the processor may execute a setting process of setting, based on the first range, a second range that includes the first range and is wider than the first range, in the captured image, and a detection process of detecting a specific region of the image corresponding to the printed matter within the second range.

In addition, the processor may superimpose an object indicating the specific region of the image corresponding to the printed matter, which is detected in the detection process, on the captured image.

The processor may superimpose the object on a live view image as the captured image.

In addition, the processor may execute an extraction process of extracting the image corresponding to the printed matter from the captured image based on an operation of a user.

In addition, the image corresponding to the printed matter may be defined by the specific region of the image corresponding to the printed matter or the object.

In addition, in the detection process, the processor may execute a first detection process, a determination process, and a second detection process. In the first detection process, a first edge in the captured image may be detected by applying an edge detection algorithm to the captured image. In the determination process, a target range may be set in which the first edge is one end and the other end is located at a position separated from the first edge by a preset number of pixels, and a plurality of second points in the target range may be determined in correspondence with a plurality of first points arranged along the first edge at a side of the one end in the target range, based on color information of each of the first point and the second point. In the second detection process, a second edge may be detected based on the plurality of second points. In addition, in the above configuration, the processor may execute an extraction process of extracting the image corresponding to the printed matter from the captured image based on the detected second edge.

In addition, in the determination process, the processor may execute, for each of the plurality of first points, a process of obtaining a color difference between a pixel of the first point and a pixel of a target point within the target range while shifting the target point from the first point toward the other end by one pixel, and a process of determining, as the second point, the target point where the color difference is maximized among the target points where the color difference is equal to or greater than a threshold value.

In addition, in the determination process, the processor may determine the plurality of first points on the first edge.

In addition, in a case in which a plurality of the first edges are detected in the first detection process, the processor may execute the determination process and the second detection process for each of the plurality of first edges.

In addition, in a case in which a print surface of the printed matter includes a print region on which an image to be printed is printed and a frame region located around the print region, the preset number of pixels may be smaller than the number of pixels corresponding to a length of a width of the frame region.

In addition, the processor may further execute a display process of displaying the captured image on a screen, and, during the execution of the display process, the processor may superimpose an object indicating the second edge detected in the second detection process on the captured image.

In addition, in a case in which a dark-colored region exists at a position adjacent to the printed matter in the captured image, the processor may detect a boundary of an image of the dark-colored region located on an opposite side of the printed matter, as the first edge, in the first detection process. In addition, in the above case, the processor may determine the plurality of second points in correspondence with the plurality of first points located on the first edge within the target range including the image of the dark-colored region, in the determination process. In addition, in the above case, the processor may detect the second edge based on the plurality of second points, in the second detection process. In addition, in the above case, the processor may extract the image corresponding to the printed matter excluding the image of the dark-colored region from the captured image based on the detected second edge, in the extraction process.

In addition, the printed matter may be a medium having a print surface on which an image to be printed is printed.

In addition, according to another embodiment of the present invention, there is provided an image processing method of extracting an image corresponding to a printed matter from a captured image, the image processing method comprising: a step of estimating a first range including the printed matter in the captured image by applying a range estimation model constructed by machine learning regarding the printed matter to the captured image, via the processor.

In addition, the image processing method may further comprise: a step of setting, based on the first range, a second range that includes the first range and is wider than the first range, in the captured image, via the processor; and a step of detecting a specific region of the image corresponding to the printed matter within the second range, via the processor.

In addition, in the image processing method, in the step of detecting the specific region of the image corresponding to the printed matter, the processor may detect a first edge in the captured image by applying an edge detection algorithm to the captured image. In addition, the processor may set a target range in which the first edge is one end and the other end is located at a position separated from the first edge by a preset number of pixels. In addition, the processor may determine a plurality of second points in the target range in correspondence with a plurality of first points arranged along the first edge at a side of the one end in the target range, based on color information of each of the first point and the second point. In this case, the image processing method may further include a step of detecting a second edge based on the plurality of second points, via the processor, and a step of extracting the image corresponding to the printed matter from the captured image based on the detected second edge, via the processor.

In addition, according to still another embodiment of the present invention, there is provided a program for causing a computer to execute the step included in the image processing method described above.

In addition, according to still another embodiment of the present invention, there is provided a computer-readable recording medium, the recording medium having a program recorded thereon for causing a computer to execute the step included in the image processing method described above.

According to one embodiment of the present invention, it is possible to accurately extract an image corresponding to a printed matter from a captured image. In addition, according to one embodiment of the present invention, it is possible to efficiently extract an image corresponding to a printed matter from a captured image.

DESCRIPTION OF THE PREFERRED EMBODIMENTS

Figure 1:
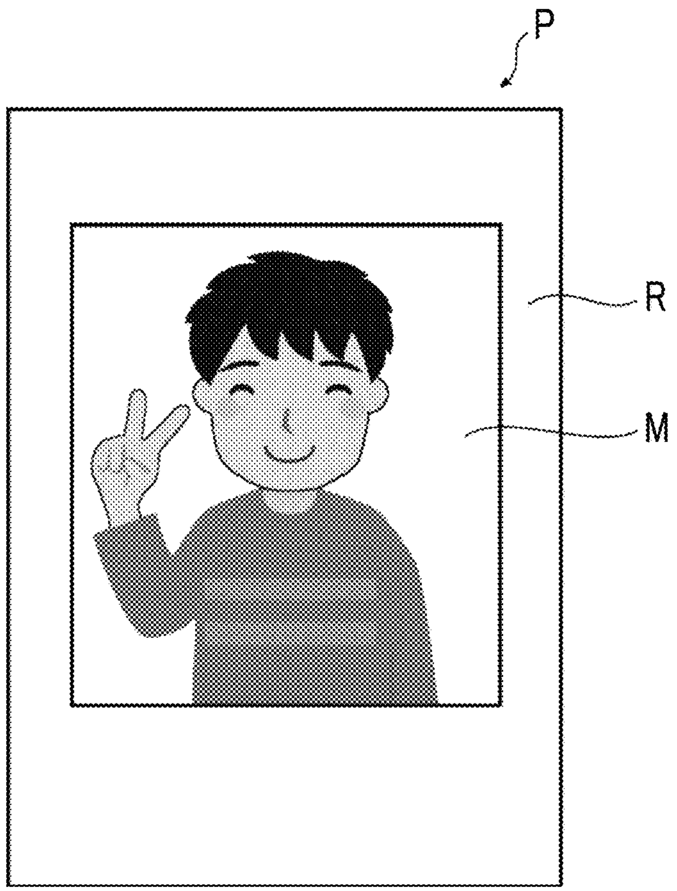
FIG. 1 is a diagram showing an example of a printed matter.

Hereinafter, specific one embodiment of the present invention will be described. In the following, for convenience of description, the description may be made in terms of a graphic user interface (GUI). Note that, since a basic data processing technique (communication/transmission technique, data acquisition technique, data recording technique, data processing/analysis technique, image processing technique, visualization technique, and the like) for realizing the contents is a known technique, the description thereof will be omitted.

In the present specification, the concept of "apparatus" includes a single apparatus that exerts a specific function, and includes a combination of a plurality of apparatuses that are distributed and present independently of each other and exert a specific function in cooperation (coordination) with each other.

In addition, in the present invention, the term "user" refers to a user of the image processing apparatus according to the embodiment of the present invention, and specifically is, for example, a person who acquires a printed matter image GP, which will be described below, using functions of the image processing apparatus according to the embodiment of the present invention.

In addition, in the present specification, the term "person" means a main subject that performs specific behavior, can include an individual, a group, a corporation, such as a company, an organization, and the like, and can also further include a computer and a device that constitute artificial intelligence (AI). The artificial intelligence realizes intellectual functions, such as reasoning, prediction, and determination, by using a hardware resource and a software resource. An algorithm of the artificial intelligence is optional, and examples thereof include an expert system, a case-based reasoning (CBR), a Bayesian network, or an inclusion architecture.

Outline of Specific Embodiment of Present Invention

One embodiment of the present invention (hereinafter, referred to as the present embodiment) relates to an image processing apparatus, an image processing method, a program, and a recording medium. More specifically, the present embodiment is a technique of extracting, from a captured image obtained by imaging a printed matter P shown in FIG. 1, an image corresponding to the printed matter.

The printed matter P is a photosensitive film F on which an image to be printed is printed. The printing in the present embodiment is, for example, instant photographic printing. Specifically, the photosensitive film F is exposed to form a latent image, and a developer pot provided at an end part of the film is broken to develop a developer in the pot on a film surface. Thus, an image in which the latent image is visualized is formed. The printing method is not limited to the instant photographic method, and may be an ink jet method, a sublimation-type thermal transfer method, an electrophotographic method using a toner, or the like.

The photosensitive film F is an example of a medium having a print surface being one surface on which an image to be printed is printed, is also referred to as an instant color film, and is a film dedicated to a printer 50 to be described below. The photosensitive film F has a rectangular outer shape and has a slight thickness. There are a plurality of types of the photosensitive films F, and an outer shape, a dimension, and a size of the film, and a feature of the print surface are different for each type of the film. The feature of the print surface is a visual feature of the print surface, and is, for example, a color (ground color), a design, a pictorial pattern, a pattern, or the like of a frame region R.

In the present embodiment, the type of the photosensitive film F may be only one. In addition, the outer shape of the photosensitive film F is not limited to a rectangle, and may be a circle or an ellipse, a quadrangle other than the rectangle, or a polygon other than the quadrangle.

As shown in FIG. 1, a print surface of the printed matter P is formed of a print region M having a print image on which an image to be printed is printed and a frame region R surrounding the print region M. The print region M is located at a central portion of the print surface and is a square or rectangular region. As shown in FIG. 1, the frame region R is a quadrangular frame-shaped region and has a predetermined width. The width of the frame region R is an interval between an outer edge of the photosensitive film F and an end position of the print region M, and the end position of the print region M is a boundary position between the print region M and the frame region R.

Figure 2:
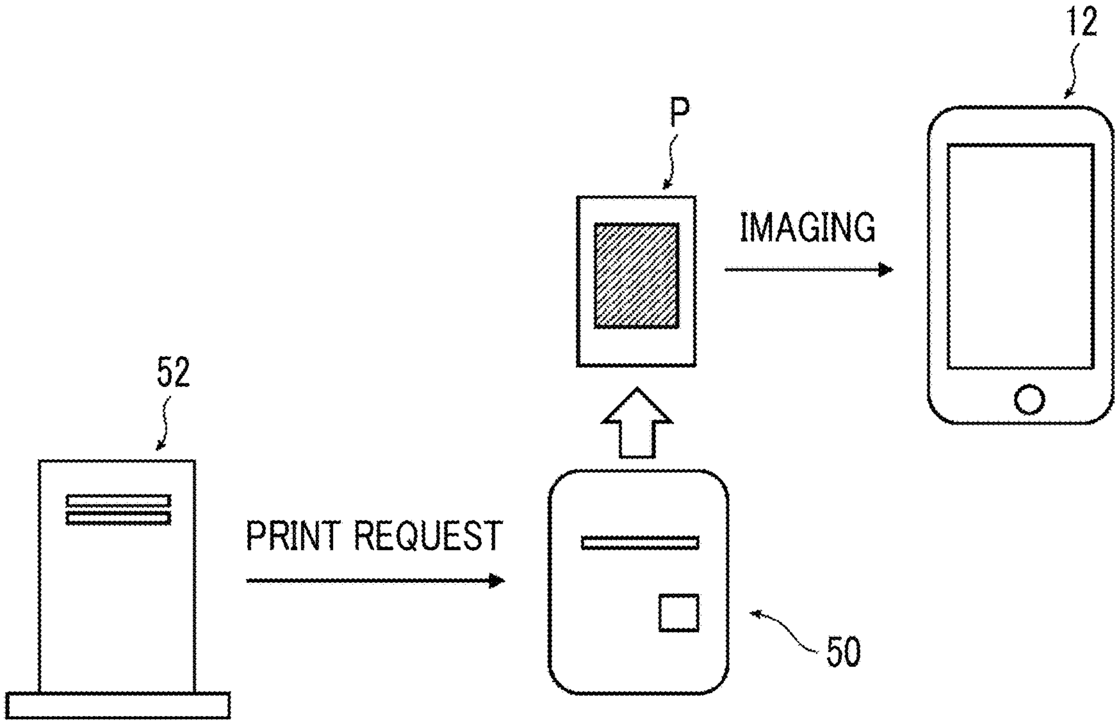
FIG. 2 is a diagram showing an image processing system including an image processing apparatus according to one embodiment of the present invention.

The printed matter P is created by the printer 50 shown in FIG. 2, for example. The printer 50 prints an image (positive image) on an image forming region of the photosensitive film F by accommodating an unused photosensitive film F and operating an exposure head (not shown) and a transport mechanism (not shown) provided in the printer.

The printer 50 is not limited to a device owned by the user and may be a store-installed printer that can be used at a store or the like.

As shown in FIG. 2, the printer 50 is connected to a control device 52 in a wireless or wired manner, and performs a printing operation under the control of the control device 52. Specifically, the control device 52 transmits a print request including an image serving as a print target (hereinafter, referred to as an image to be printed) to the printer 50, and in a case in which the print request is received, the printer 50 prints the image to be printed pertaining to the print request on the photosensitive film F. The image to be printed may be an image captured by a digital camera or the like, or an illustration image or a computer graphic (CG) image created by image creation software or the like. In addition, the image to be printed may be a text image.

The control device 52 may be built in the printer 50. In this case, an auxiliary storage apparatus such as a memory card or an imaging device such as a digital camera is connected to the printer 50, and the control device 52 reads out an image from the apparatus or device connected to the printer 50. The read-out image may be printed on the photosensitive film F by the printer 50 as an image to be printed. In addition, the control device 52 may be mounted on the imaging device. The control device 52 may be a user terminal 12 that constitutes the image processing apparatus according to the present embodiment.

A user who has obtained the printed matter P images the printed matter P by using a digital camera, a camera mounted on a smart device, or the like for the purpose of obtaining an image (specifically, digital image data) corresponding to the printed matter P. The image corresponding to the printed matter P is an image of a region where the printed matter P exists in a captured image obtained by imaging the printed matter P, and will hereinafter be referred to as a "printed matter image GP" for convenience of description.

Figure 3:
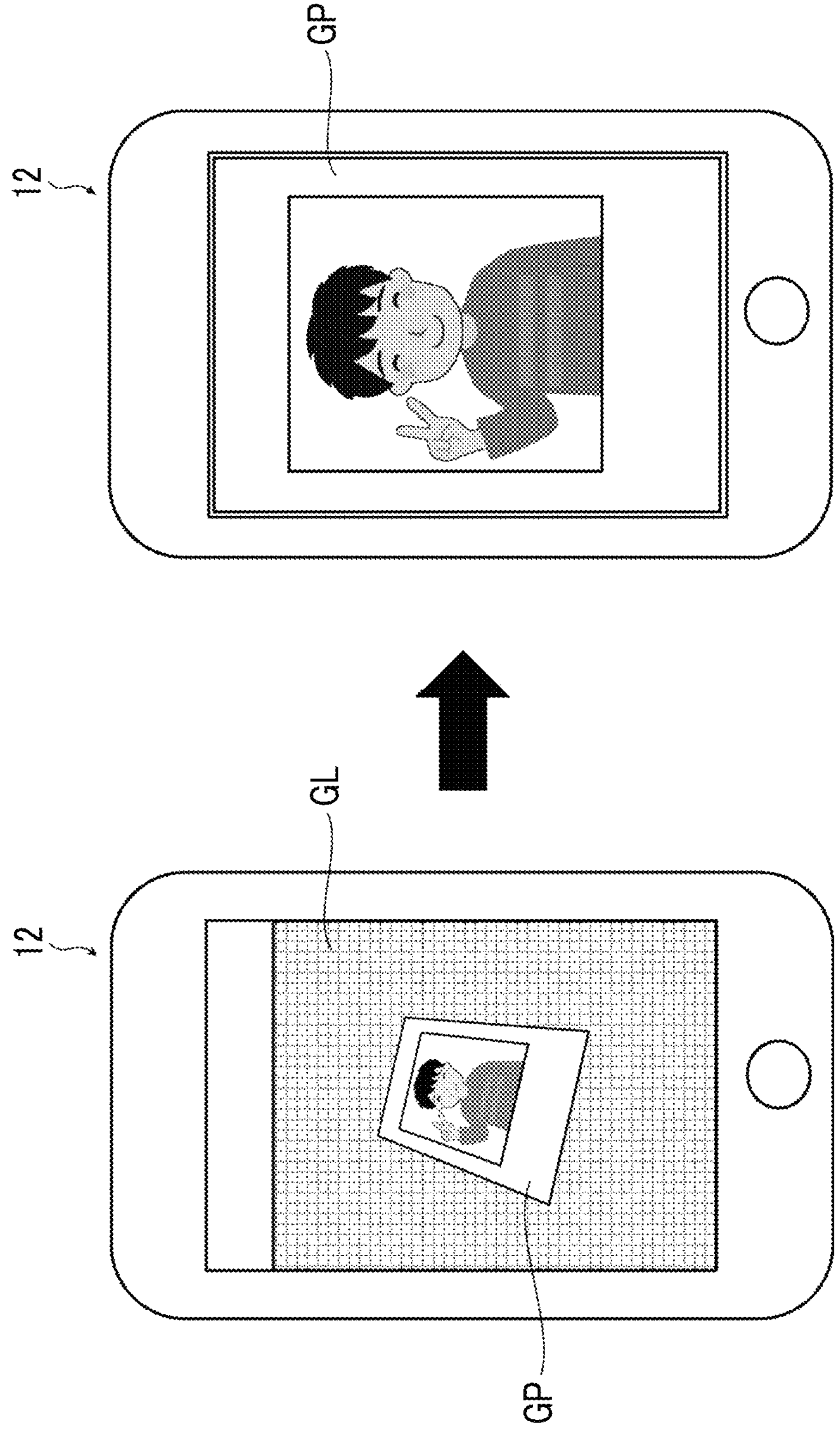
FIG. 3 is a diagram showing a captured image and an image corresponding to a printed matter.

As shown in FIG. 3, an object, a background, or the like around the printed matter P (hereinafter, also referred to as a peripheral image) is reflected in the captured image. In the present embodiment, as shown in FIG. 3, it is possible to acquire the printed matter image GP while avoiding reflected glare of the peripheral image. In other words, according to the present embodiment, it is possible to detect edges of the printed matter P in the captured image, and extract and acquire (capture) an image within the edges, that is, the printed matter image GP. The acquired image of the printed matter P is stored as image data and is then used by the user for various purposes.

Regarding Configuration of Image Processing Apparatus According to One Embodiment of Present Invention A configuration example of the image processing apparatus (hereinafter, referred to as an image processing apparatus 10) according to the present embodiment will be described. The image processing apparatus 10 is used by the user for the purpose of extracting the printed matter image GP in which the peripheral image is removed from the captured image obtained by imaging the printed matter P.

The image processing apparatus 10 is configured of a computer having a processor, and is configured of, for example, an information processing terminal (hereinafter, referred to as a user terminal 12) owned by the user. Specific examples of the user terminal 12 include a personal computer (PC), a smart phone, a tablet terminal, and a digital camera having a data processing function. In the following, a case in which the user terminal 12 is a smart device such as a smart phone or a tablet terminal will be described as an example.

Figure 4:
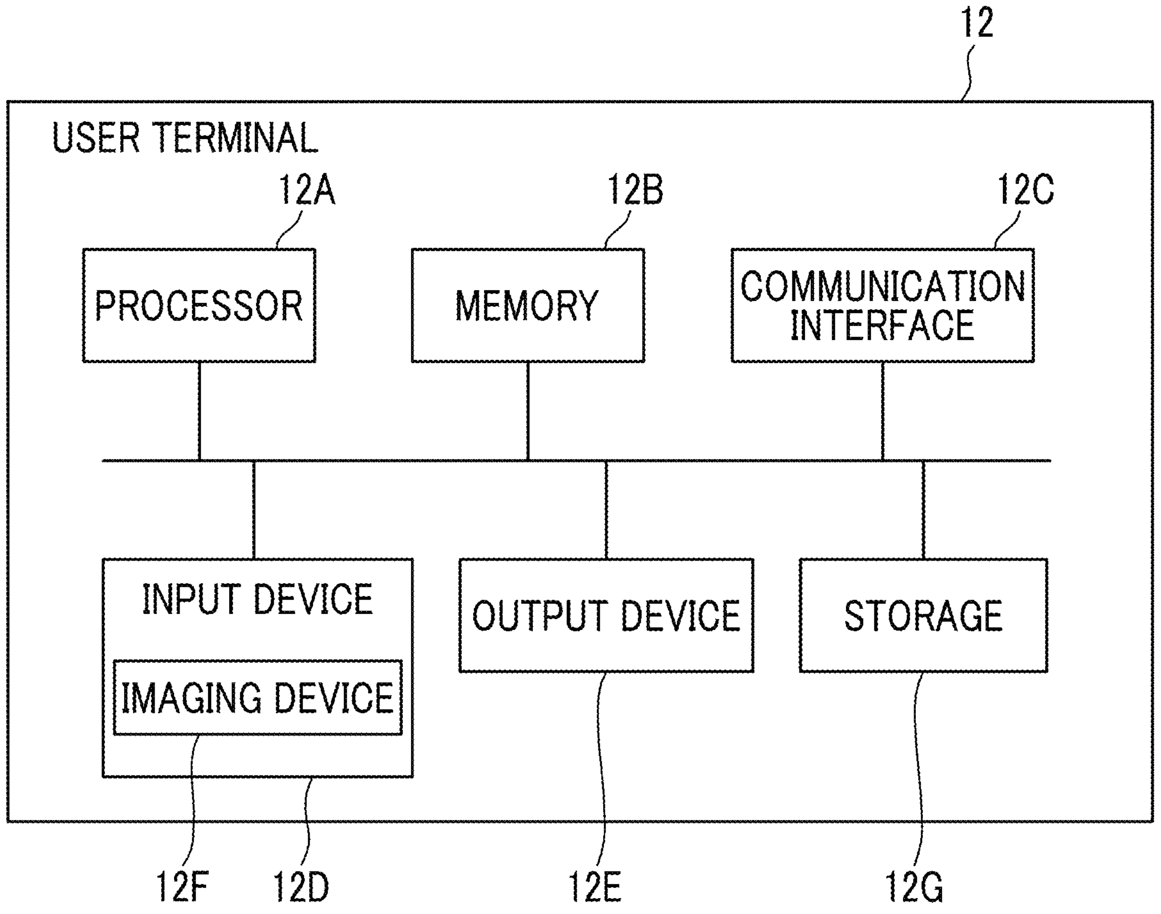
FIG. 4 is a diagram showing a hardware configuration of the image processing apparatus according to one embodiment of the present invention.

As shown in FIG. 4, the user terminal 12 comprises a processor 12A, a memory 12B, a communication interface 12C, and the like. The processor 12A is configured of, for example, a central processing unit (CPU), a graphics processing unit (GPU), a digital signal processor (DSP), or a tensor processing unit (TPU). The memory 12B is configured of, for example, a semiconductor memory such as a read only memory (ROM) and a random access memory (RAM). The communication interface 12C is configured of, for example, a network interface card or a communication interface board.

In addition, as shown in FIG. 4, the user terminal 12 further comprises an input device 12D, an output device 12E, and a storage 12G. The input device 12D is configured of a touch panel, a cursor button, and the like, and receives a user's input operation. The user's input operation includes a capture operation performed by the user in a case of acquiring (capturing) the printed matter image GP. The output device 12E includes a display as a display device.

The input device 12D includes an imaging device 12F such as a terminal with a built-in camera. The imaging device 12F has an imaging lens, an image sensor (imaging element), and the like, receives light from a subject within an imaging angle of view, converts the received light image into an electric signal, and converts the electric signal into digital data to generate image data.

In the present embodiment, the imaging device 12F is used for imaging the printed matter P. Specifically, in a case in which the imaging device 12F is activated and the printed matter P is disposed within the imaging angle of view, the imaging device 12F images the printed matter P and the periphery thereof. As a result, a captured image of the printed matter P, specifically, a live view image GL is displayed on a screen of the display. The live view image GL is a captured image generated based on an output signal from the image sensor of the imaging device 12F, and is a real-time image while imaging is being performed by the imaging device 12F.

The user terminal 12 captures the printed matter image GP by the imaging device 12F at a timing at which the user performs the capture operation, while the live view image GL is being displayed. Here, capturing the printed matter image GP means extracting a region of the captured image where the printed matter P exists and capturing an image of the region to acquire the captured image as the printed matter image GP.

Various types of information necessary for acquiring the printed matter image GP are stored in the storage 12G. The processor 12A can freely access various types of information stored in the storage 12G. The information stored in the storage 12G includes a range estimation model described below.

The storage 12G may be built in or externally attached to the user terminal 12, or may be configured by using a network attached storage (NAS) or the like. Alternatively, the storage 12G may be an external device capable of communicating with the user terminal 12 via the Internet or a mobile communication network, such as an online storage.

The memory 12B stores a program for image processing (hereinafter, an image processing program) of acquiring the printed matter image GP. The image processing program is an application program for causing the processor 12A to execute each process (each step) in an image processing flow described below. The image processing program may be acquired by being read from a computer-readable recording medium, or may be acquired by being downloaded through a communication network such as the Internet or an intranet.

In addition, the image processing apparatus 10 may be configured by cooperation between a server computer for an application service provider (ASP), a software as a service (SaaS), a platform as a service (PaaS), or an infrastructure as a service (IaaS), and the user terminal 12. In this case, in a case in which the user inputs necessary information through the user terminal 12, the server computer described above executes a series of processes related to the acquisition of the printed matter image GP based on the input information. As a result, the user can obtain the printed matter image GP.

Acquisition Procedure of Printed Matter Image

A procedure of acquiring (capturing) the printed matter image GP will be described with reference to FIGS. 5A to 5D.

Figure 5A:
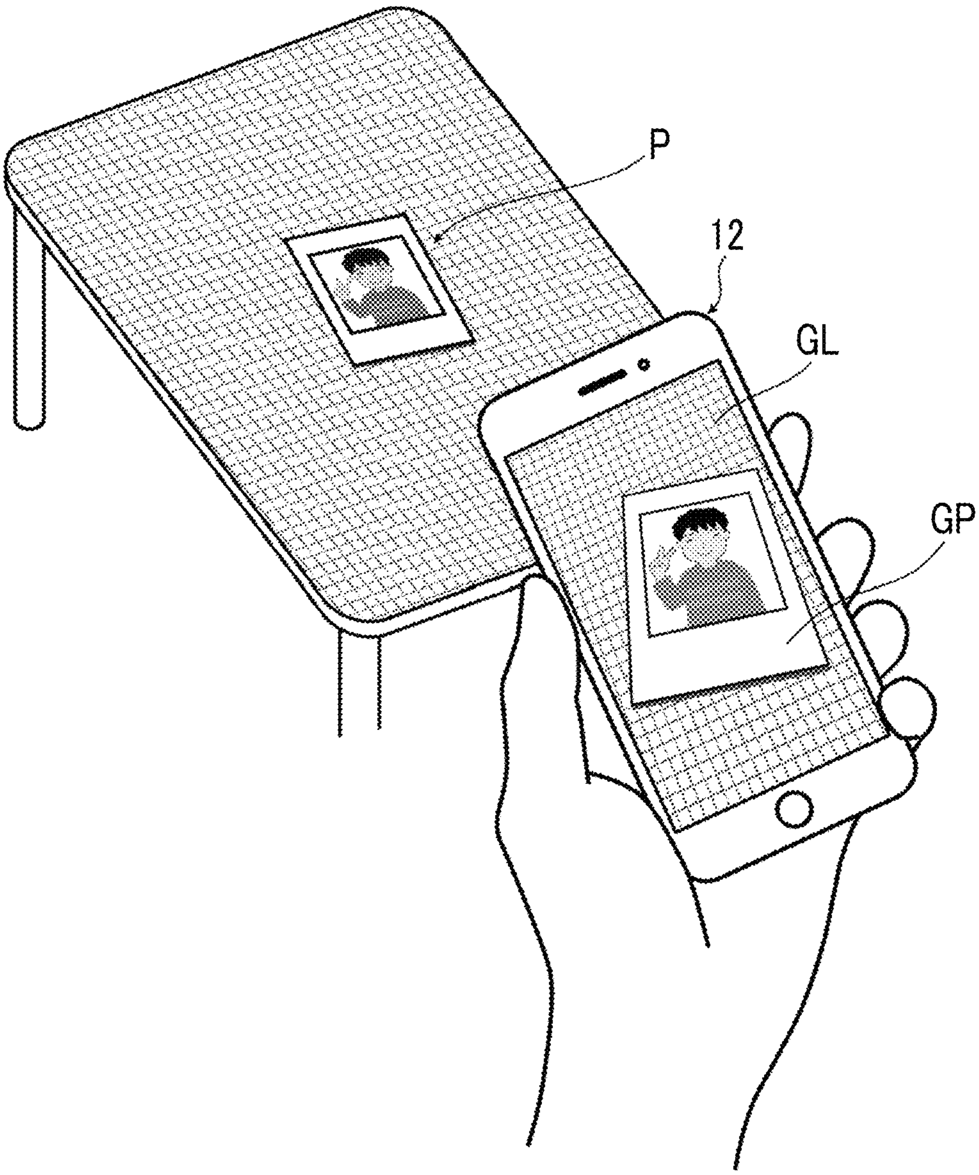
FIG. 5A is a diagram showing a flow of extracting an image corresponding to a printed matter from a captured image (part 1).

In a case in which the printed matter image GP is acquired, first, the printed matter P as a target is created by the printer 50. Thereafter, as shown in FIG. 5A, the printed matter P is imaged by the imaging device 12F of the user terminal 12. As a result, the captured image of the printed matter P, specifically, the live view image GL is displayed on the screen of the display of the user terminal 12.

While the live view image GL is being displayed, a range including the printed matter P (hereinafter, referred to as a first range) in the live view image GL is estimated. The first range is set as a range surrounding the printed matter P, and for example, in a case of FIG. 5B, a rectangular range indicated by a broken line is set as the first range. Each direction of a long side and a short side of the first range is defined by two axes (coordinate axes) defining the display screen of the live view image GL. Specifically, the long side of the first range is parallel to one coordinate axis, and the short side of the first range is parallel to the other coordinate axis.

Figure 5B:
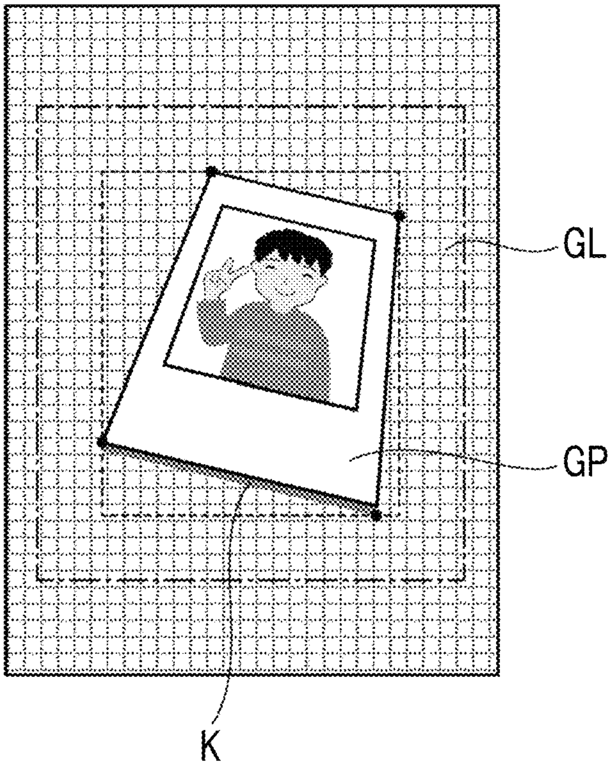
FIG. 5B is a diagram showing the flow of extracting the image corresponding to the printed matter from the captured image (part 2).

As shown in FIG. 5B, the first range is set such that an outer edge of the printed matter P is inscribed therein, and more specifically, corners of the printed matter P are located on a contour line of the first range.

The shape of the first range is not limited to a rectangle, and may be, for example, a quadrangle other than the rectangle, a polygon other than the quadrangle, a circle, or an ellipse.

Thereafter, based on the first range, a range for detecting the printed matter P (hereinafter, referred to as a second range) is set in the live view image GL. The second range is a range expanded from the first range, and has an outer edge at a position away from an outer edge of the first range by a predetermined distance. That is, the second range is a range that is wider than the first range and includes the first range inside. As described above, the second range is set such that the printed matter image GP is included in the range with a high probability. As a result, in a case in which an edge of the printed matter image GP is detected, the edge of the printed matter image GP can be detected more reliably within the second range.

The second range has a shape corresponding to the first range, and in a case of FIG. 5B, a rectangular range indicated by a one-dot chain line is set as the second range. A long side and a short side of the second range are defined by two axes (coordinate axes) defining the display screen of the live view image GL, as with the first range. Specifically, the long side of the second range is parallel to one coordinate axis, and the short side of the second range is parallel to the other coordinate axis.

The shape of the second range is not limited to a rectangle, and may be, for example, a quadrangle other than the rectangle, a polygon other than the quadrangle, a circle, or an ellipse. In addition, an interval between the contour line of the first range and a contour line of the second range can be optionally determined.

Thereafter, a detection process is applied to the second range, and a first edge of the image of the printed matter P is detected within the second range. The first edge is a normal edge detected by a known edge detection technique. The original first edge corresponds to a specific region of the printed matter image GP in the captured image, and specifically, corresponds to an image of an outer edge of the printed matter image GP.

On the other hand, as shown in FIG. 5B, a dark-colored region K may exist at a position adjacent to a part of the outer edge of the printed matter P in the live view image GL due to a position of a light source during imaging, or the like. The dark-colored region K is a region of the live view image GL that has a significantly lower brightness than the frame region R of the printed matter P, and specifically, is a region in which a shadow of the printed matter P is reflected. In addition, in the dark-colored region K, a gradation of brightness is formed, and for example, the closer to the outer edge of the printed matter P, the darker the brightness.

In a case in which the dark-colored region K exists, a boundary of the dark-colored region K may be detected as the first edge. In particular, in a case in which the printed matter P having a slight thickness is imaged as in the present embodiment, a shadow is likely to be generated around the printed matter P, and the boundary of the dark-colored region K may be detected as the first edge. Here, the boundary of the dark-colored region K is a boundary with an image of a region outside the dark-colored region K in the image of the dark-colored region K. The region outside the dark-colored region K is a desk, a floor, or the like on which the printed matter P is disposed, that is, a portion corresponding to a background of the printed matter P.

Therefore, in the present embodiment, a process for avoiding a situation where the boundary of the dark-colored region K is erroneously detected as the edge of the printed matter image GP is executed. Specifically, in a case in which the dark-colored region K is present at a position adjacent to the printed matter P, a second edge is detected at a position on the printed matter P side with respect to the first edge. The second edge is an edge corresponding to the outer edge of the true printed matter P without the dark-colored region K, and corresponds to a boundary between the printed matter P and the dark-colored region K (in other words, a specific region of the printed matter image GP).

Figure 5C:
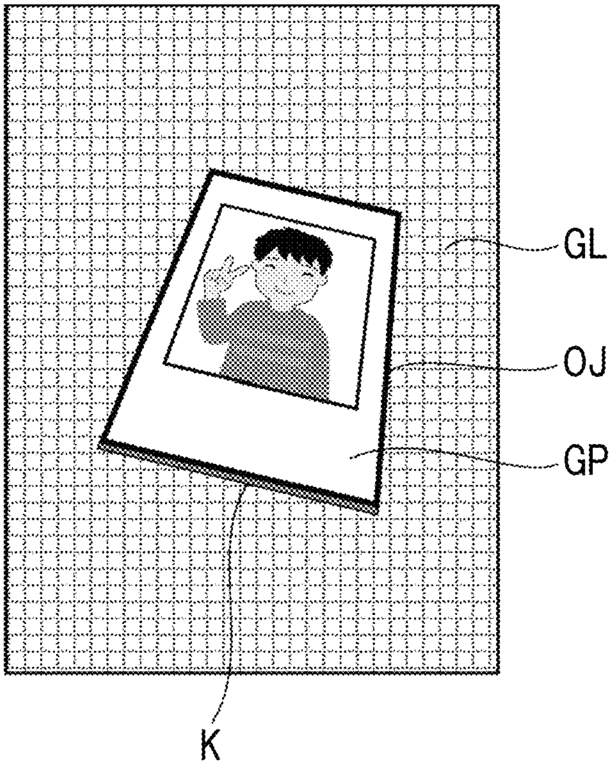
FIG. 5C is a diagram showing the flow of extracting the image corresponding to the printed matter from the captured image (part 3).

Then, in a case in which the edge of the printed matter image GP is specified by the first edge or by the second edge in a case in which the second edge is detected, an object OJ indicating the edge is superimposed on the live view image GL as shown in FIG. 5C. The above object OJ is a frame surrounding the image of the printed matter P, and specifically is a line image located at the first edge or at the second edge. Through the display of the object OJ, the user can check a position, a size, a shape, and the like of the printed matter P in the live view image GL.

A display aspect (for example, a display color, presence or absence of highlight display such as blinking, and a display time) in a case of displaying the object OJ may be freely set. In addition, a type of the object OJ is not limited to a frame-shaped object surrounding the image of the printed matter P, and may be an indicator such as a cursor, or an L-shaped mark or a mark indicating a corner of the image of the printed matter P.

Thereafter, in a case in which the user performs a capture operation and the capture operation is received, this is used as a trigger to extract and capture the printed matter image GP from the captured image at that point in time. Here, the printed matter image GP to be extracted is surrounded by the edge (first edge or second edge) of the printed matter image GP or the edge defined by the object OJ, specifically, indicated by the object OJ.

The capturing of the printed matter image GP is not limited to a case in which the capturing is executed based on the capture operation of the user, and may be automatically executed at a point in time at which the edge of the printed matter image GP is detected.

Figure 5D:
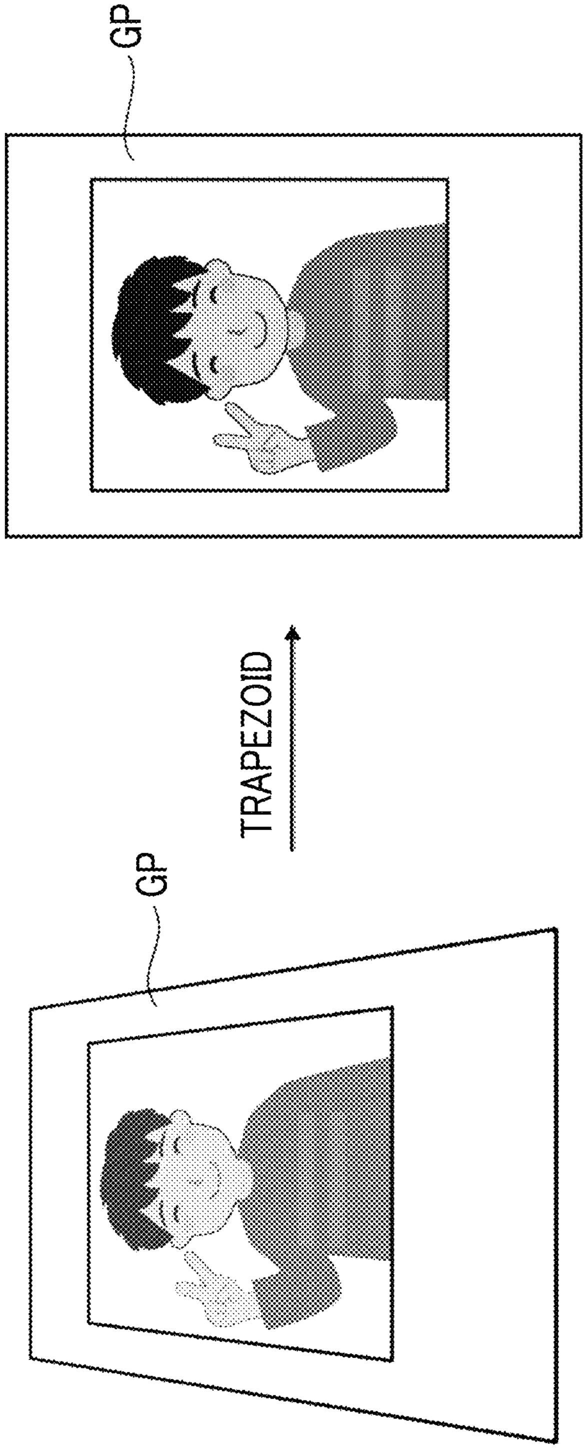
FIG. 5D is a diagram showing the flow of extracting the image corresponding to the printed matter from the captured image (part 4).

Geometric conversion is appropriately executed on the captured printed matter image GP. Specifically, in a case in which the print surface of the printed matter P does not face the front in an imaging direction at the point in time of capturing, trapezoidal correction is executed on the captured printed matter image GP. As a result, as shown in FIG. 5D, it is possible to obtain the printed matter image GP in a case in which the print surface faces the front.

Figure 6:
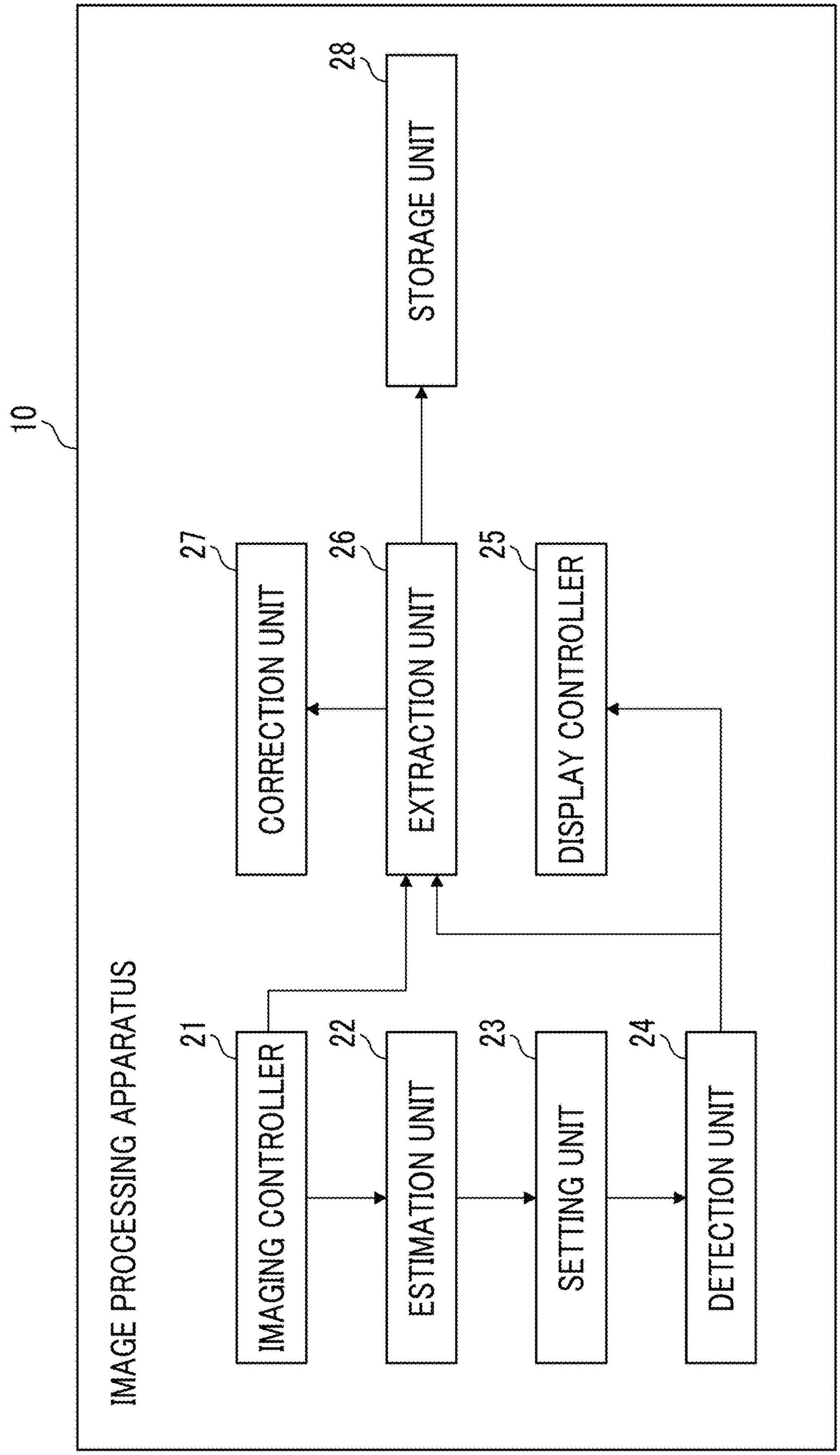
FIG. 6 is an explanatory diagram of a function of the image processing apparatus according to one embodiment of the present invention.

Function of Image Processing Apparatus According to One Embodiment of Present Invention The configuration of the image processing apparatus 10 according to the present embodiment will be described again from a functional perspective. As shown in FIG. 6, the image processing apparatus 10 includes an imaging controller 21, an estimation unit 22, a setting unit 23, a detection unit 24, a display controller 25, an extraction unit 26, a correction unit 27, and a storage unit 28. These functional units are realized by cooperation between a hardware device included in the user terminal 12 constituting the image processing apparatus 10 and various programs (software) including the image processing program described above. A part of the functions may be realized by artificial intelligence (AI). Hereinafter, each functional unit will be described.

Imaging Controller

The imaging controller 21 executes an imaging process of controlling the imaging device 12F of the user terminal 12 to acquire the captured image. In a case in which the printed matter P is disposed within the imaging angle of view during the execution of the imaging process, the imaging controller 21 acquires the captured image in which the printed matter P and the periphery thereof are reflected, specifically, the live view image GL through the execution of the imaging process.

Estimation Unit

The estimation unit 22 executes an estimation process and estimates the first range including the printed matter P in the live view image GL (captured image) acquired by the imaging controller 21. In the estimation process, the first range is estimated by applying a range estimation model to the live view image GL (captured image). The range estimation model is constructed by machine learning regarding the printed matter P, more specifically, machine learning regarding an appearance of the printed matter P.

The appearance of the printed matter P used in machine learning is at least one item of a size of the printed matter P, a shape of the printed matter P, or a feature of the print surface of the printed matter P. The machine learning is executed by using images of a plurality of printed matters P having various appearances as training data. With the range estimation model constructed by machine learning, the printed matter P is recognized and the position, the shape, and the size of the printed matter P in the live view image GL are estimated based on the appearance of the printed matter P reflected in the live view image GL.

As described above, in the present embodiment, it is possible to appropriately and accurately estimate the first range as a range where the printed matter P exists in the live view image by using the range estimation model constructed by machine learning.

The type of machine learning is not limited, and may be any one of supervised learning, unsupervised learning, or reinforcement learning. In addition, a machine learning algorithm is not particularly limited, and a known algorithm such as a backpropagation method or a gradient descent method can be used.

The range estimation model constructed by machine learning is any mathematical model, and specific examples thereof include a neural network, a convolutional neural network, a recurrent neural network, an attention, a transformer, a generative adversarial network, and a deep learning neural network. In addition, for example, a Boltzmann machine, a matrix factorization, a factorization machine, an M-way factorization machine, a field aware factorization machine, a field aware neural factorization machine, a support-vector machine, a Bayesian network, a decision tree, or random forests can be used as the range estimation model.

In addition, the machine learning may be executed by the image processing apparatus 10. In that case, the range estimation model may be stored in the storage 12G or the like, and the estimation unit 22 may read out the range estimation model from the storage 12G or the like in a case of executing the estimation process. Alternatively, the machine learning may be executed by an external apparatus (not shown) different from the image processing apparatus 10. In that case, the estimation unit 22 can execute the estimation process using the range estimation model provided from the apparatus that has executed the machine learning.

Setting Unit

The setting unit 23 executes a setting process based on the first range estimated by the estimation unit 22. In the setting process, the second range that includes the first range and is wider than the first range is set in the live view image GL based on the first range. As described above, in the setting process, the second range is set such that the printed matter image GP is included in the range with a high probability. That is, in the present embodiment, the second range can be set such that the edge of the printed matter image GP can be detected more reliably in the detection process described below.

Detection Unit

The detection unit 24 executes the detection process on the live view image GL acquired in the imaging process. In the detection process, an edge which is a specific region of the printed matter image GP is detected in the second range of the live view image GL set in the setting process. In a case in which the entire printed matter P is reflected in the live view image GL, each side of a rectangle formed by an outer edge of the printed matter P, that is, each of four sides, is detected as the edge.

In addition, in the detection process of the present embodiment, the detection unit 24 detects the second edge as an edge of a portion of the printed matter image GP where the above-described dark-colored region K exists, and detects the first edge as an edge of a portion where the dark-colored region K does not exist. A specific procedure of the detection process and the like will be described in a below section in detail.

Display Controller

The display controller 25 controls the display (display device) of the user terminal 12 to execute a display process. In the display process, the live view image GL acquired by the imaging process is displayed on the screen of the display. The display process is executed simultaneously with the imaging process during a period in which the imaging process is executed. That is, while the printed matter P is being imaged, the live view image GL including the printed matter P is displayed on the screen.

In addition, during the execution of the display process, the display controller 25 superimposes the object OJ indicating the edge detected in the above-described detection process on the live view image GL (see FIG. 5C). In this case, in a case in which the second edge is detected in the detection process, the object OJ indicating the detected second edge is superimposed on the live view image GL.

Extraction Unit

In a case in which the user performs the capture operation (an example of an operation), the extraction unit 26 executes an extraction process based on the operation. In the extraction operation, an image defined by the edge detected by the detection unit 24 (in other words, the edge indicated by the above-described object OJ), that is, the printed matter image GP is extracted and captured from the captured image at a point in time at which the capture operation is performed. In the extraction process in a case in which the detection unit 24 detects the second edge, the printed matter image GP is extracted from the captured image based on the detected second edge.

Correction Unit

The correction unit 27 executes a correction process on the printed matter image GP extracted by the extraction unit 26. In the correction process, the correction unit 27 performs, for example, trapezoidal correction to correct the printed matter image GP to an image in a case in which the printed matter P is viewed from the front.

Since a known image processing technique related to the trapezoidal correction can be used for the trapezoidal correction, description related to a specific procedure thereof will be omitted.

Storage Unit

The storage unit 28 executes a storage process to store the printed matter image GP extracted by the extraction unit 26 in the storage 12G or the like. In the storage process in a case in which the correction unit 27 executes the trapezoidal correction on the printed matter image GP, the printed matter image GP after the trapezoidal correction is stored.

Regarding Procedure of Detection Process

Figure 8:
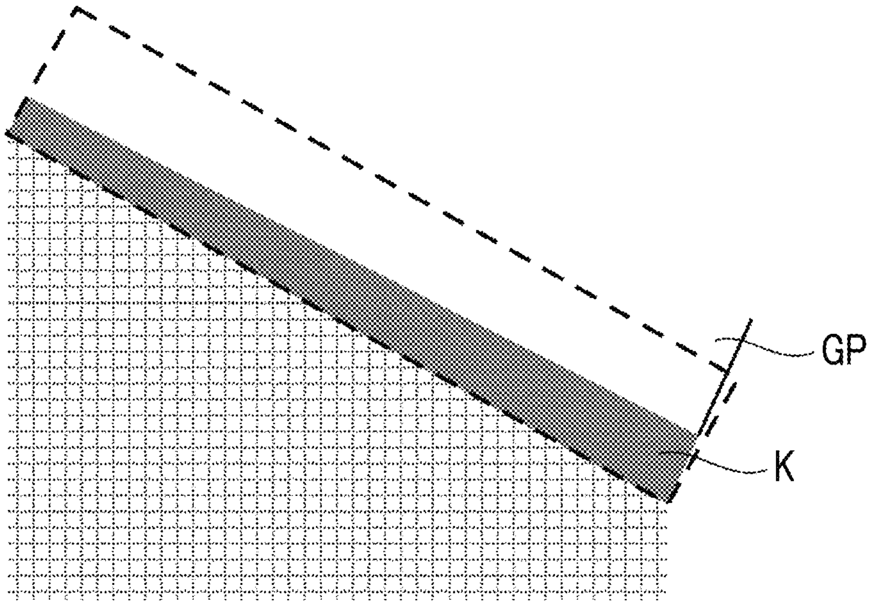
FIG. 8 is a second explanatory diagram of the procedure of the detection process.
Figure 9:
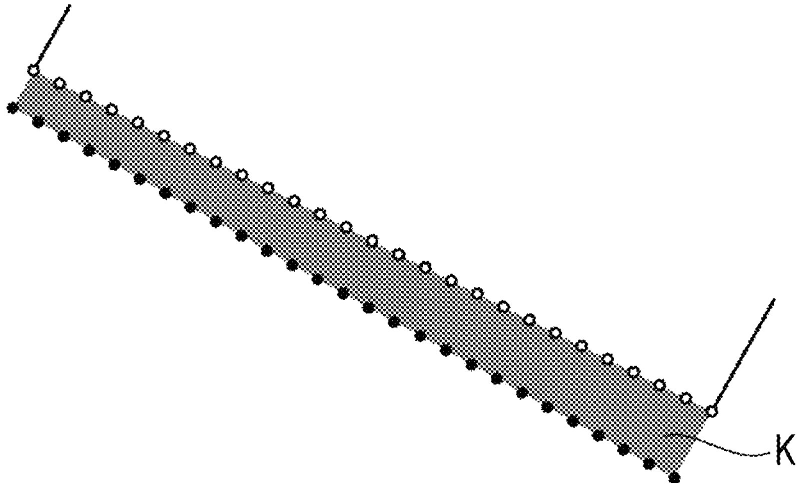
FIG. 9 is a third explanatory diagram of the procedure of the detection process.

A procedure of the detection process will be described with reference to FIGS. 7 to 10. FIGS. 8 and 9 are enlarged views of a part of the live view image GL. Specifically, FIGS. 8 and 9 show enlarged views of an image of a periphery of a side, which is adjacent to the dark-colored region K, of the outer edge of the printed matter P.

In the detection process, a first detection process, a determination process, and a second detection process are executed in this order. In the first detection process, an edge detection algorithm is applied to the captured image to detect the first edge in the live view image GL within the second range. The first edge is detected by applying a known edge detection algorithm.

Specifically, in the first detection process, first, color information of each pixel within the second range, specifically, a gradation value, a density, a brightness, or a coordinate value of a color space of each pixel is specified from the outer edge of the second range toward the inside. Then, in a case in which the color information is significantly changed between two adjacent pixels, that is, in a case in which a color difference between the pixels is equal to or greater than a threshold value, for example, the pixel located further inside is specified as a pixel on the first edge. The first edge is detected by sequentially detecting such pixels.

In the first detection process, an image of the edge of the printed matter image GP, that is, the outer edge of the printed matter P in the live view image GL is originally detected as the first edge. In addition, in the first detection process, a plurality of edges surrounding the printed matter image GP are detected. Specifically, as shown in FIG. 7, four first edges (denoted by a symbol E1 in FIG. 7) are detected corresponding to four sides of a rectangle formed by the outer edge of the printed matter P.

Figure 7:
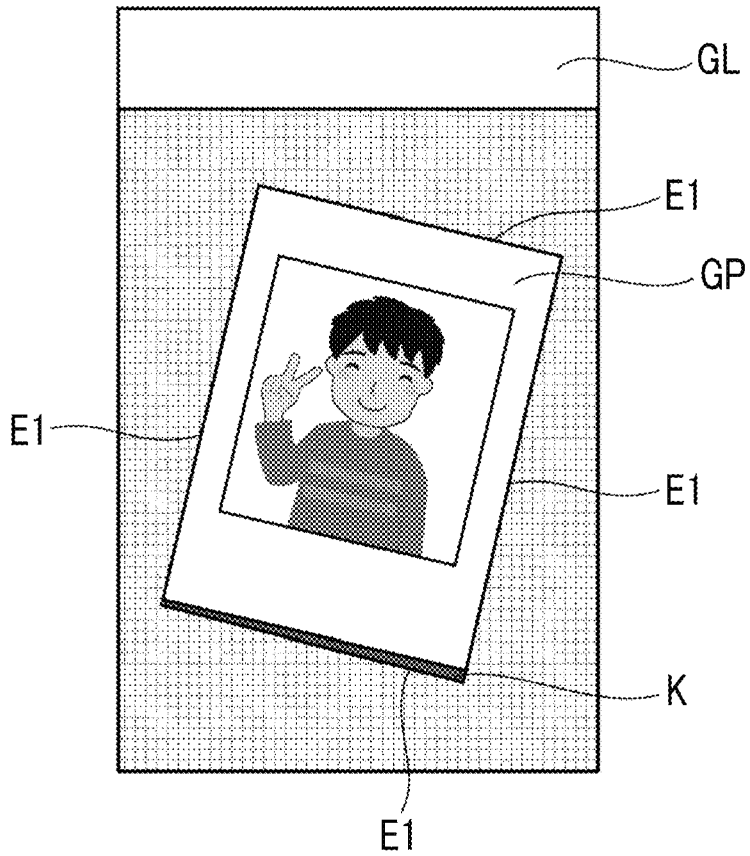
FIG. 7 is a first explanatory diagram of a procedure of a detection process.

On the other hand, as shown in FIG. 7, the dark-colored region K, such as an image of a shadow of the printed matter P, may exist at a position adjacent to a part of the outer edge of the printed matter P in the live view image GL. In this case, in the first detection process, the boundary of the dark-colored region K, that is, the boundary of the image of the dark-colored region K located on an opposite side of the printed matter P is detected as the first edge. Such a first edge is not the original edge of the printed matter image GP, but it is necessary to detect the correct edge of the printed matter image GP. Therefore, in the present embodiment, the detection unit 24 executes the determination process and the second detection process after the first detection process is executed.

In the present embodiment, a plurality of the first edges are detected in the first detection process, and the determination process and the second detection process are executed for each of the plurality of first edges. More specifically, in the first detection process, four first edges are detected in correspondence with the four sides of the rectangle formed by the outer edge of the printed matter P, so that the determination process and the second detection process are repeatedly executed four times each.

In the determination process, first, the target range is set in the second range. The target range is a range in which the first edge is one end and the other end is located at a position separated from the first edge by a preset number of pixels. The one end and the other end of the target range are both ends of the target range in a direction orthogonal to the first edge in a case in which the first edge extends linearly or substantially linearly. In addition, the other end of the target range is an end located on the printed matter image GP side as viewed from one end (that is, the first edge) of the target range.

As shown in FIG. 8, the target range (range surrounded by a broken line in FIG. 8) has a certain width. The width of the target range is defined by the number of pixels from the one end to the other end of the target range, and the number of pixels (hereinafter, the number of pixels m; m is a natural number) is set in advance. More specifically, for a target range set for a portion where the dark-colored region K exists, the number of pixels m is set such that the dark-colored region K is included in the target range as shown in FIG. 8.

In addition, the number of pixels m is smaller than the number of pixels corresponding to a length of the width of the frame region R of the printed matter P. With such a setting, for example, it is possible to avoid detecting a boundary between the frame region R and the print region M of the printed matter P as the second edge. In other words, the second edge is detected outside the boundary between the frame region R and the print region M.

In addition, the number of pixels m need only be a numerical value smaller than the number of pixels corresponding to the length of the width of the frame region R, and may be set optionally, but may be determined according to a distance (interval) between the imaging device 12F and the printed matter P in a case of imaging the printed matter P, for example. For example, the number of pixels m may be about 15 pixels. In a case in which the distance between the imaging device 12F and the printed matter P is changed, the number of pixels m may dynamically fluctuate in conjunction with the change.

After the target range is set, a plurality of first points arranged along the first edge are set on one end side of the target range. In the present embodiment, as shown in FIG. 9, a plurality of first points (indicated by black circle dots in FIG. 9) are determined on the first edge.

Each of the plurality of first points is not limited to being set on the first edge, and may be set at a position closer to the other end side of the target range than the first edge.

The set number of the first points and the interval (pitch) between two adjacent first points are not particularly limited, but are preferably suitable values for detecting the second edge.

Next, as shown in FIG. 9, a plurality of second points (indicated by white circle dots in FIG. 9) in the target range are determined in correspondence with the plurality of set first points. In this case, the second point is determined based on color information of each of the first point corresponding to the second point and the second point. The color information is a gradation value, a density, a brightness, a coordinate value of a color space, or the like of a pixel at which each of the first point and the second point is located, and in the present embodiment, is a gradation value of three colors, which are red, green, and blue (RGB). The gradation value is not limited to a value represented in an RGB color space, and may be, for example, a coordinate value represented in a hue, saturation chroma, value brightness (HSV) space.

Figure 10:
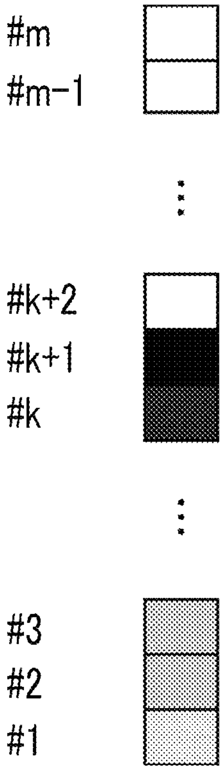
FIG. 10 is a fourth explanatory diagram of the procedure of the detection process.

With regard to a procedure of determining the plurality of second points, a calculation process and a point determination process are executed for each of the plurality of first points. In the calculation process, a target point within the target range is set, and a color difference between a pixel of the first point and a pixel of the target point is obtained while shifting the target point from one first point toward the other end of the target range in a direction orthogonal to the first edge by one pixel. In FIG. 10, a color difference from a pixel #1 corresponding to the first point is obtained for each of pixels #2 to #m.

In the point determination process, whether or not there is a target point where the color difference obtained in the calculation process is equal to or greater than a threshold value is determined. Then, in a case in which there are target points where the color difference is equal to or greater than the threshold value, a target point where the color difference is maximized among the target points is determined as the second point.

In the case of FIG. 10, the color difference is equal to or greater than the threshold value in a case in which the target point is located at a pixel of #k (k is a natural number equal to or greater than 2) and in a case in which the target point is located at a pixel of #k+1. In this case, the color difference obtained for the pixel of #k+1 is maximized, and a point (target point) located at the pixel of #k+1 is determined as the second point.

The above threshold value may be set to an appropriate value in determining the second point.

An example of a method of determining the second point in the above-described procedure is a method of generating a MaxImage. With regard to a procedure for generating the MaxImage, first, bilateral filtering is applied to the RGB image constituting the live view image GL. The RGB image to which the bilateral filtering is applied is converted into a gray image. In addition, the RGB image to which the bilateral filtering is applied is divided into component images of an R image, a G image, and a B image. Furthermore, the RGB image to which the bilateral filtering is applied is converted into an image in an HSV space, channels of hue and chroma saturation are extracted from the converted image, and an image for each channel is separated.

As described above, for the RGB image, six single channel images, that is, a gray image, a chroma saturation image, a hue image, a red (R) image, a green (G) image, and a blue (B) image are obtained. Then, Median blur, Gaussian blur, and Canny filter are applied to each of the six single channel images. Thereafter, from a gradation value of a pixel at each position in each single channel image, the maximum gradation value in the six channel images is specified for the pixel at each position by Expression (1), and the value is set as the gradation value of the pixel at each position.

$$\text{MaxImage}[i][j]=\text{Max}(\text{Gray}[i][j],\text{Saturation}[i][j],\mathit{Hue}[i][j],\mathit{Red}[i][j],\text{Green}[i][j],\text{Blue}[i][j]) \quad \text{Expression (1)}$$

Then, the gradation value of the pixel at each position is set in the above manner, whereby the MaxImage is generated. Then, using the generated MaxImage, for each of the plurality of first points on the first edge, a point where the gradation value of the MaxImage is maximized is found on a virtual line orthogonal to the first edge through the first point. The point (pixel) found in this manner is determined as the second point.

The determination process is executed in accordance with the above procedure. Then, in the determination process in a case in which the dark-colored region K is included in the target range, a plurality of second points corresponding to the plurality of first points are determined within the target range. Specifically, the plurality of second points are determined along the boundary of the dark-colored region K included in the target range.

After the determination process is executed, the second detection process is executed, and the second edge is detected based on the plurality of determined second points in the second detection process. Specifically, an OpenCV fitLine algorithm is applied to determine a line passing through the plurality of second points, and the determined line is detected as the second edge.

By executing the detection process according to the procedure described above, in a case in which the image of the dark-colored region K is adjacent to the printed matter image GP, the second edge located at a boundary between both the images can be detected. As a result, the edge of the printed matter image GP is accurately detected. As a result, in the subsequent extraction process, the printed matter image GP excluding the image of the dark-colored region K can be extracted and captured from the captured image based on the detected second edge.

Operation Example of Image Processing Apparatus According to One Embodiment of Present Invention Next, as an operation example of the image processing apparatus 10 according to the present embodiment, an image processing flow using the image processing apparatus 10 will be described. In the image processing flow described below, an image processing method according to the embodiment of the present invention is used. That is, each step in the image processing flow described below corresponds to a component of the image processing method according to the embodiment of the present invention.

The following flow is merely an example, and within a range not departing from the gist of the present embodiment, a part of steps in the flow may be deleted, a new step may be added to the flow, or an execution order of two steps in the flow may be exchanged.

Figure 11:
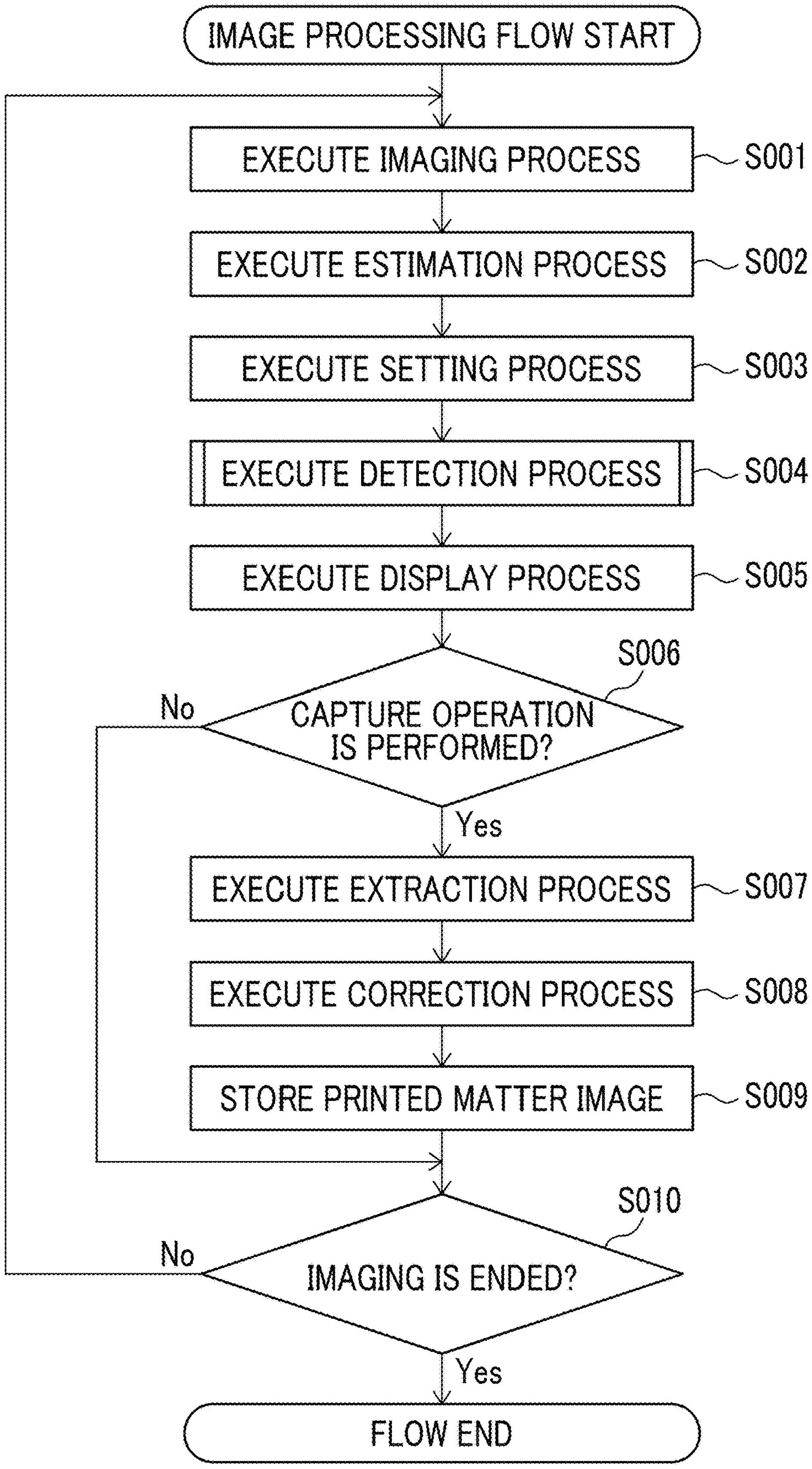
FIG. 11 is a diagram showing an image processing flow according to one embodiment of the present invention.

Each step in the image processing flow according to the present embodiment is executed in an order shown in FIG. 11 by the processor 12A provided in the user terminal 12 constituting the image processing apparatus 10. In addition, in each step in the image processing flow, the processor 12A executes a process corresponding to each step in the data processing defined in the image processing program.

In a case in which the image processing flow is executed, the user creates the printed matter P by the printer 50. Then, the user operates the user terminal 12 to activate the image processing program. As a result, the image processing flow is started.

In the image processing flow, first, the processor 12A executes the imaging process of controlling the imaging device 12F of the user terminal 12 to acquire the captured image (S001). At this point in time, the printed matter P is disposed within the imaging angle of view of the imaging device 12F. Therefore, in the imaging process, the printed matter P and periphery thereof are imaged, and the live view image GL as the captured image is acquired.

While the imaging process is being executed, the processor 12A repeatedly executes the estimation process (S002), the setting process (S003), the detection process (S004), and the display process (S005).

In the estimation process, the first range including the printed matter P in the live view image GL is estimated by applying the above-described range estimation model to the live view image GL (captured image) (see FIG. 5B). That is, in the image processing flow, it is possible to accurately estimate a range where the printed matter P exists in the live view image by using a learning result of machine learning regarding the printed matter P.

In the setting process, the second range that includes the first range and is wider than the first range is set in the live view image GL based on the first range estimated in the estimation process (see FIG. 5B). The entire printed matter image GP is substantially reliably included in the set second range.

In the detection process, the edge of the printed matter image GP is detected in the second range. In a case in which the entire printed matter P is reflected in the live view image GL, each side of a rectangle formed by the outer edge of the printed matter P, that is, each of four sides, is detected as the edge.

Figure 12:
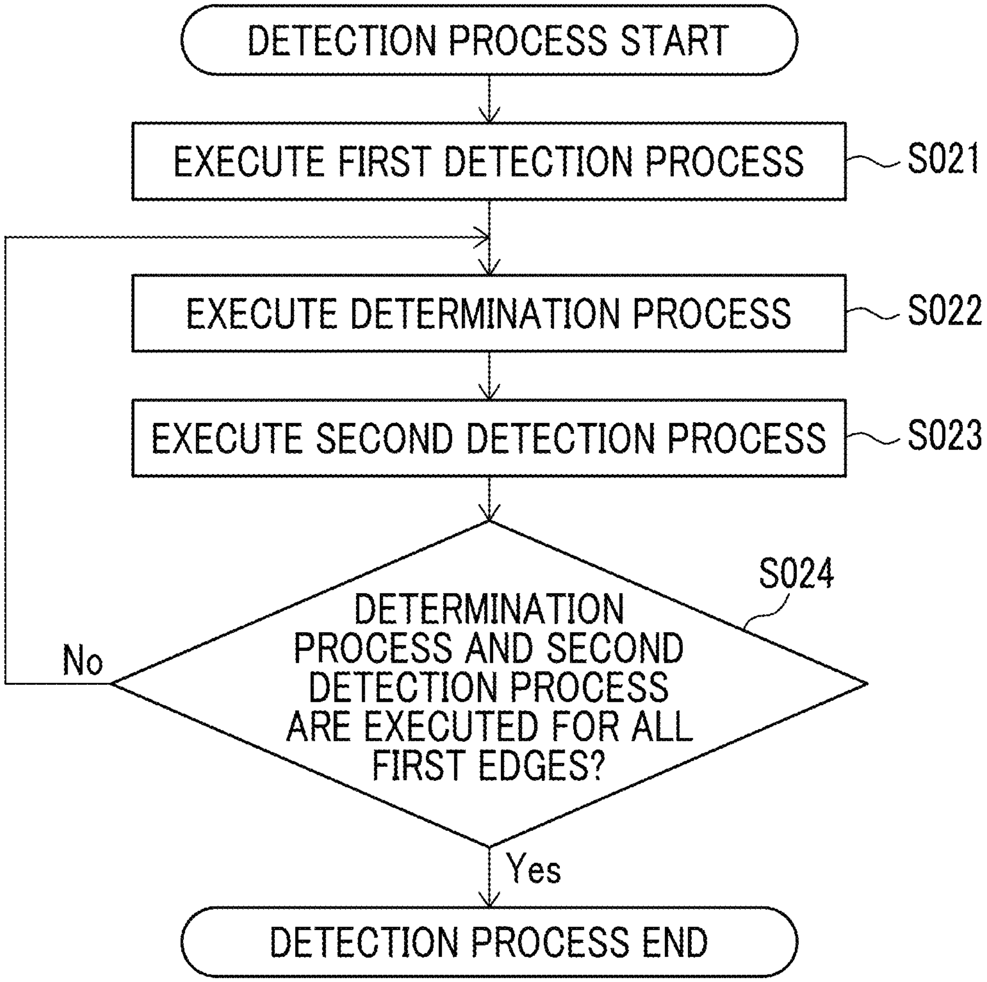
FIG. 12 is a diagram showing a flow of the detection process.

The detection process proceeds in accordance with the flow shown in FIG. 12. Specifically, in the detection process, first, the first detection process is executed (S021). In the first detection process, a known edge detection algorithm is applied to the live view image GL (captured image). As a result, the first edge is detected within the second range set in the setting process. In particular, in a case in which the entire printed matter image GP is included in the second range, four first edges are detected in correspondence with four sides formed by the outer edge of the printed matter P.

After the first detection process is executed, the determination process (S022) and the second detection process (S023) are executed. The determination process is executed in the above-described manner. Specifically, in the second range, a set range is set with reference to the first edge, and the plurality of first points are set on one end side of the set range, for example, on the first edge. Then, the plurality of second points corresponding to the plurality of first points are determined within the set range. Each of the plurality of second points is determined based on the color difference between the corresponding first point and second point.

In the second detection process, the second edge is detected based on the plurality of second points determined in the determination process. As a result, even in a case in which the dark-colored region K such as a shadow exists at a position adjacent to the printed matter P and the boundary of the dark-colored region K is detected as the first edge, it is possible to detect the second edge as the original edge of the printed matter image GP.

Then, the determination process and the second detection process are executed for each of the plurality of first edges detected in the first detection process (S024).

In the printed matter image GP, the second edge is not detected for the first edge located at a portion where the dark-colored region K does not exist, and in this case, the first edge is the edge of the printed matter image GP.

Returning to the description of the image processing flow, in the display process, the live view image GL is displayed on the screen of the user terminal 12. In addition, in the display process, the object OJ indicating the edge (specifically, the second edge or the first edge) of the printed matter image GP detected in the detection process is superimposed and displayed on the live view image GL. As a result, the user can easily check the position, the shape, and the size of the printed matter image GP by looking at the object OJ on the screen. In addition, the user can understand from the display of the object OJ that the edge of the printed matter image GP has been detected in the live view image GL.

Then, in a case in which the user performs the capture operation on the user terminal 12 in a state where the object OJ is displayed on the screen (S006), the processor 12A receives the capture operation and executes the extraction process (S007). In the extraction process, the printed matter image GP defined by the edge indicated by the object OJ is extracted from the captured image at a point in time at which the capture operation is executed.

Thereafter, the processor 12A executes the correction process, and in the correction process, the trapezoidal correction is appropriately executed on the extracted printed matter image GP (S008). In a case in which the extracted printed matter image GP is an image in a case in which the printed matter P is viewed from the front, in other words, in a case in which the edge of the printed matter image GP is an accurate rectangular, the execution of the correction process may be omitted.

Then, the processor 12A stores the extracted printed matter image GP or the printed matter image GP on which the trapezoidal correction is executed in the storage or the like (S009).

The series of steps S001 to 009 described above are repeatedly executed until imaging is ended (S010). Then, at a point in time at which the imaging is ended, the image processing flow is completed.

Other Embodiments

Although the specific embodiment of the present invention has been described above, the above-described embodiment is merely an example for ease of understanding of the present invention, and is not intended to limit the present invention. That is, the present invention may be changed or improved from the embodiment described below without departing from the spirit of the present invention. In addition, the present invention includes an equivalent thereof. Furthermore, the embodiment of the present invention can include a form in which the above-described embodiment and one or more of the following modification examples are combined.

Method of Determining Second Point

In the above-described embodiment, as one of the methods of detecting the second edge, the method of creating a MaxImage and determining a plurality of second points (gradation points) to detect the second edge has been described. However, the present invention is not limited to this, and the second edge may be detected by a general edge detection method, for example, a known edge detection method such as a Sobel filter or a Canny method.

Regarding Dark-Colored Region

In the above-described embodiment, in a case in which there is an image of a shadow as the dark-colored region K adjacent to the outer edge of the printed matter P in the captured image of the printed matter P, the printed matter image GP in which the image of the shadow is removed is extracted. Therefore, in the above-described embodiment, the second edge is detected at a position inside the first edge, and the detected second edge is treated as the boundary between the image of the shadow and the printed matter image GP. However, the dark-colored region K is not limited to the shadow, and may be a region darker than the original brightness (specifically, the ground color of the print surface of the photosensitive film F) of the frame region R of the printed matter P. For example, a fading portion at an outer edge portion of the printed matter P may be set as the dark-colored region K.

Regarding Edge Detection Range

In the above-described embodiment, in the live view image GL as the captured image, the first range including the printed matter is estimated, the second range that includes the first range and is wider than the first range is set, and the edge of the printed matter image GP is detected in the second range. However, the present invention is not limited to this, and the edge of the printed matter image GP may be detected in the first range.

Regarding Type of Processor

The processor provided in the image processing apparatus according to the embodiment of the present invention includes various processors. Examples of the various processors include a CPU that is a general-purpose processor that executes software (program) and functions as various processing units.

In addition, the various processors include a programmable logic device (PLD) that is a processor of which a circuit configuration can be changed after manufacturing, such as a field programmable gate array (FPGA).

Furthermore, the various processors include a dedicated electric circuit that is a processor having a circuit configuration specially designed for executing a specific process, such as an application specific integrated circuit (ASIC).

One processing unit provided in the image processing apparatus according to the embodiment of the present invention may be configured of one of the above-described various processors. Alternatively, one processing unit may be configured by a combination of two or more processors of the same type or different types, for example, a combination of a plurality of FPGAs or a combination of an FPGA and a CPU.

In addition, a plurality of functional units of the image processing apparatus according to the embodiment of the present invention may be configured by one of the various processors, or two or more of the plurality of functional units may be configured by one processor.

In addition, as in the above-described embodiment, one processor may be configured of a combination of one or more CPUs and software, and the processor may function as the plurality of functional units.

In addition, for example, as typified by a system on chip (SoC) or the like, a form may be adopted in which a processor that realizes the functions of the entire system including the plurality of functional units in the image processing apparatus according to the embodiment of the present invention with one integrated circuit (IC) chip is used. In addition, a hardware configuration of the various processors described above may be an electric circuit (circuitry) in which circuit elements such as semiconductor elements are combined.

EXPLANATION OF REFERENCES

10: image processing apparatus
12: user terminal
12A: processor
12B: memory
12C: communication interface
12D: input device
12E: output device
12F: imaging device
12G: storage
21: imaging controller
22: estimation unit
23: setting unit
24: detection unit
25: display controller
26: extraction unit
27: correction unit
28: storage unit
50: printer
52: control device
F: photosensitive film
GP: printed matter image
K: dark-colored region
GL: live view image
M: print region
OJ: object
P: printed matter
R: frame region

What is claimed is:

1. An image processing apparatus that extracts an image corresponding to a printed matter from a captured image, the image processing apparatus comprising:
a processor,
wherein the processor executes an estimation process of estimating a first range including the printed matter in the captured image by applying a range estimation model constructed by machine learning regarding the printed matter to the captured image,
wherein the processor executes
a setting process of setting, based on the first range, a second range that includes the first range and is wider than the first range, in the captured image, and
a detection process of detecting a specific region of the image corresponding to the printed matter within the second range, and
wherein, in the detection process, the processor executes
a first detection process of detecting a first edge in the captured image by applying an edge detection algorithm to the captured image,
a determination process of setting a target range in which the first edge is one end and the other end is located at a position separated from the first edge by a preset number of pixels, and determining a plurality of second points in the target range in correspondence with a plurality of first points arranged along the first edge at a side of the one end in the target range, based on color information of each of the first point and the second point,
a second detection process of detecting a second edge based on the plurality of second points, and
the processor executes an extraction process of extracting the image corresponding to the printed matter from the captured image based on the detected second edge.

2. The image processing apparatus according to claim 1, wherein, in the estimation process, the processor estimates the first range by applying the range estimation model constructed by the machine learning regarding an appearance of the printed matter to the captured image.

3. The image processing apparatus according to claim 2, wherein the appearance is at least one of a size of the printed matter, a shape of the printed matter, or a feature of a print surface of the printed matter.

4. The image processing apparatus according to claim 1, wherein the processor superimposes an object indicating the specific region of the image corresponding to the printed matter, which is detected in the detection process, on the captured image.

5. The image processing apparatus according to claim 4, wherein the processor superimposes the object on a live view image as the captured image.

6. The image processing apparatus according to claim 4, wherein the processor executes an extraction process of extracting the image corresponding to the printed matter from the captured image based on an operation of a user.

7. The image processing apparatus according to claim 6, wherein the image corresponding to the printed matter is defined by the specific region of the image corresponding to the printed matter or the object.

8. The image processing apparatus according to claim 1, wherein, in the determination process, the processor executes, for each of the plurality of first points, a process of obtaining a color difference between a pixel of the first point and a pixel of a target point in the target range while shifting the target point from the first point toward the other end by one pixel, and a process of determining, as the second point, the target point where the color difference is maximized among the target points where the color difference is equal to or greater than a threshold value.

9. The image processing apparatus according to claim 1, wherein, in the determination process, the processor determines the plurality of first points on the first edge.

10. The image processing apparatus according to claim 1, wherein, in a case in which a plurality of the first edges are detected in the first detection process, the processor executes the determination process and the second detection process for each of the plurality of first edges.

11. The image processing apparatus according to claim 1, wherein, in a case in which a print surface of the printed matter includes a print region on which an image to be printed is printed and a frame region located around the print region, the preset number of pixels is smaller than the number of pixels corresponding to a length of a width of the frame region.

12. The image processing apparatus according to claim 1, wherein the processor further executes a display process of displaying the captured image on a screen, and during the execution of the display process, the processor superimposes an object indicating the second edge detected in the second detection process on the captured image.

13. The image processing apparatus according to claim 1, wherein, in a case in which a dark-colored region exists at a position adjacent to the printed matter in the captured image, the processor detects a boundary of an image of the dark-colored region located on an opposite side of the printed matter, as the first edge, in the first detection process, determines the plurality of second points in correspondence with the plurality of first points located on the first edge within the target range including the image of the dark-colored region, in the determination process, detects the second edge based on the plurality of second points, in the second detection process, and extracts the image corresponding to the printed matter excluding the image of the dark-colored region from the captured image based on the detected second edge, in the extraction process.

14. The image processing apparatus according to claim 1, wherein the printed matter is a medium having a print surface on which an image to be printed is printed.

15. An image processing method of extracting an image corresponding to a printed matter from a captured image, the image processing method comprising:

a step of estimating a first range including the printed matter in the captured image by applying a range estimation model constructed by machine learning regarding the printed matter to the captured image, via the processor, a step of setting, based on the first range, a second range that includes the first range and is wider than the first range, in the captured image, via the processor; and a step of detecting a specific region of the image corresponding to the printed matter within the second range, via the processor wherein, in the step of detecting the specific region of the image corresponding to the printed matter, the processor detects a first edge in the captured image by applying an edge detection algorithm to the captured image, and the processor sets a target range in which the first edge is one end and the other end is located at a position separated from the first edge by a preset number of pixels, and determines a plurality of second points in the target range in correspondence with a plurality of first points arranged along the first edge at a side of the one end in the target range, based on color information of each of the first point and the second point, and the image processing method further includes a step of detecting a second edge based on the plurality of second points, via the processor, and a step of extracting the image corresponding to the printed matter from the captured image based on the detected second edge, via the processor.

16. A non-transitory computer-readable recording medium, the recording medium having a program recorded thereon for causing a computer to execute the step included in the image processing method according to claim 15.

* * * * *